3,039,918
AGENTS FOR COMBATING PLANT INJURING NEMATODES
Erich Hambsch and Fritz Herbold, Gersthofen, near Augsburg, Germany, assignors to Farbwerke Hoechst Aktiengesellschaft vormals Meister Lucius & Brüning, Frankfurt am Main, Germany, a corporation of Germany
No Drawing. Filed Jan. 26, 1960, Ser. No. 4,623
Claims priority, application Germany Jan. 30, 1959
4 Claims. (Cl. 167—22)

The combating of plant injuring nematodes is a problem that recently gained increasing importance. Various difficulties are encountered, for instance, owing to the fact that some types are able to survive in the form of permanent cysts for long periods of time in the soil. In the presence of suitable host plants the parasites again breed rapidly. Attempts have, therefore, been made to inhibit growth and displacement of the parasites. For example, appropriate successions of crops were recommended, the cultivation of certain plants was prohibited, and proposals for vaporizing and gasing the soil were made.

Whereas some of these measures due to the high costs and labour involved therewith are economical in special cases only, others cannot be applied since their realization depends in too high a degree on meteorological conditions and kind of soil. In other cases the preparations are phytotoxic and require waiting periods which are not allowable in practice.

Now we have found that ethenes of the general formula $$(R_1S)ClC=CCl(SR_2)$$

in which $R_1$ and $R_2$ represent a hydrogen atom, an aliphatic group containing 1 to 5 carbon atoms or a benzyl radical, are particularly suitable for combating plant injuring nematodes. $R_1$ and $R_2$ may be equal or different. Preferably $R_1$ and $R_2$ represent a hydrogen atom as in 1,2-dichloro-1,2-bis-(mercapto)-ethene or an aliphatic radical with 2 to 3 carbon atoms, as, for instance, in 1,2-dichloro-1,2-bis(ethylmercapto)-ethene or 1,2-dichloro-1,2-bis-(propylmercapto)-ethene. Naturally, mixtures of several of the above-mentioned substances can be used.

The compounds according to the invention can be prepared according to the method described by H. Baganz and K. E. Krüger in Chem. Ber., 91, 809 (1958), for the preparation of 1,2-dichloro-1,2-bis-(ethylmercapto)-ethene by reacting tetrachlorethene with mercaptides.

The compounds can be handled easily. They are applied to the surface of the soil and worked in. It is advisable to use the substances in conjunction with fillers and diluents in order to yield a uniform distribution in the soil. As diluents there can be used for instance water in which the active substance is emulsified or suspended, furthermore organic solvents such as acetone, esters of aliphatic carboxylic acids, mineral oils and tar oils. As fillers there enter into consideration solid carriers such as alumina, talc, silica, chalk or likewise fertilizers. If desired, the compounds obtained according to the invention are formulated by the aid of the above-mentioned substances and with the addition of dispersing agents and emulsifiers as dusting powders, wettable powders or emulsion concentrates.

When applied in the soil the agents do not exhibit phytotoxic properties. This is of importance, for instance, in the cultivation of potatoes which are very susceptible to *Heterodera rostochienses*. Even ornamental plants, a few highly delicate types excepted, are not remarkably injured when treated with double the necessary amount.

Since in the case of the culture plants tested no waiting periods have to be observed, the combating of the nematodes can be carried out without interrupting the succession of crops. The coil is suitably treated within the periods of strong breeding of the nematodes in order to obtain a persevering effect.

To the pests which can be combated by means of the agents according to the invention there are mentioned, for instance, the nematode *Heterodera rostochiensis* which, due to its ability of forming cysts, causes considerable damages in potato cultures, furthermore the different kinds of Ditylenchus, so-called eel worms, in clover and cereals, Aphelenchoides spec. on ornamental plants, and Meloidogyne spec. as molesting green-house pests. The latter, originating in tropical regions are infesting, for instance, cucumbers, tomatoes and lettuce.

The amount of active substance to be applied varies within certain limits depending upon the kind of nematodes as well as on the type and the degree of infestation of the soil. In considerably infested garden earth rich in humus quantities below 20 grams/m.$^2$ are already sufficient in order to completely inhibit the growth of nematodes forming cysts. Against free-living nematodes, particularly Aphelenchoides and Ditylenchus minor quantities are already sufficient.

A further advantage consists in that the soil need not be covered upon treatment with nematocides according to the invention.

The following examples serve to illustrate the invention but they are not intended to limit it thereto.

*Example 1*

In laboratory tests the preparations were dissolved in water by means of acetone as solubilizer and contacted in various concentrations with free-living nematodes, particularly Ditylenchus spec. 24 hours later the nematodes were examined. In the following table the number of dead animals is indicated in percent.

| Preparation | Effect at a concentration of— | | |
|---|---|---|---|
| | 0.5% | 0.1% | 0.03% |
| 1,2-dichloro-1,2-bis-(ethylmercapto)-ethene | 100 | 100 | 77 |
| 1,2-dichloro-1,2,bis-(mercapto)-ethene | 100 | 100 | 100 |
| 1,2-dichloro-1,2-bis-(benzylmercapto)-ethene | | 100 | 50 |

*Example 2*

In green-house tests 1,2-dichloro-1,2-bis-(ethylmercapto)-ethene was mixed with 9 parts of talc and worked into earth considerably infested with *Heterodera rostochiensis* in an amount of 150 milligrams of active substance per 1 liter of earth. Potatoes were planted into the treated earth as host plants of the nematodes. After 6 and 8 weeks the tests were evaluated. In comparison with untreated controls no new cysts nor larvae were found.

A similar effect was obtained with 1,2-dichloro-1,2-bis-(benzylmercapto)-ethene.

*Example 3*

Earth heavily infested with free-living nematodes, particularly Dithylenchus and Aphelenchoides spec., was sprayed with 1,2-dichloro-1,2-bis-(ethylmercapto)-ethene in the form of an aqueous emulsion in a quantity of 150 milligrams of active substance per liter of earth and placed into the green-house. After 5 days all nematodes were dead.

We claim:
1. A method of combating nematodes which comprises applying to the soil a nematocide of the general formula $$(R_1S)ClC=CCl(SR_2)$$

wherein $R_1$ and $R_2$ each represent a member selected from the group consisting of hydrogen, alkyl radicals with 1 to 5 carbon atoms and the benzyl residue.

2. The method as claimed in claim 1, wherein the nematocide is applied by spraying on the soil an aqueous dispersion thereof.

3. The method as claimed in claim 1, wherein the nematocide is applied in admixture with a solid carrier by incorporating said mixture into the soil.

4. A nematocide comprising 1,2-dichloro-1,2-bis-(benzylmercapto)-ethene, and a carrier therefor.

References Cited in the file of this patent

UNITED STATES PATENTS 2,893,911 Raasch _____ July 7, 1959